(12) United States Patent
Wentworth et al.

(10) Patent No.: US 7,861,485 B1
(45) Date of Patent: *Jan. 4, 2011

(54) METHOD FOR INSTALLING A STANCHION ON A TILE ROOF AND SYSTEM THEREFOR

(76) Inventors: Stuart H. Wentworth, 108 Crest Ave., Alamo, CA (US) 94507-2646; Claudia H. Wentworth, 108 Crest Ave., Alamo, CA (US) 94507-2646

( * ) Notice: Subject to any disclaimer, the term of this patent is extended or adjusted under 35 U.S.C. 154(b) by 298 days.

This patent is subject to a terminal disclaimer.

(21) Appl. No.: 11/821,927

(22) Filed: Jun. 26, 2007

(51) Int. Cl.
*E04G 23/00* (2006.01)

(52) U.S. Cl. .................... 52/745.06; 52/745.2; 52/219; 52/173.3; 52/518; 248/237; 248/507; 248/519; 182/45; 29/402.01; 29/402.03; 29/402.12; 29/402.14

(58) Field of Classification Search ............. 52/27, 52/219, 199, 173.3, 506.05, 518, 745.2, 745.06; 248/148, 158, 519, 237, 309.2, 314, 57, 58, 248/507; 136/244; 126/623; 182/8, 45; 29/402.01, 402.03, 402.08, 402.12, 402.14
See application file for complete search history.

(56) References Cited

U.S. PATENT DOCUMENTS

| | | | | |
|---|---|---|---|---|
| 1,883,508 A * | 10/1932 | Bonday | ............... | 248/536 |
| 2,439,063 A * | 4/1948 | Shur | ............... | 248/536 |
| 4,426,813 A * | 1/1984 | Buzzi, Jr. | ............... | 52/27 |
| 4,581,863 A * | 4/1986 | Thaler | ............... | 52/126.2 |
| 4,799,642 A * | 1/1989 | Wright | ............... | 248/516 |
| 4,932,185 A * | 6/1990 | Lebel | ............... | 52/704 |
| 4,965,971 A * | 10/1990 | Jean-Jacques et al. | ............... | 52/199 |
| 5,010,700 A * | 4/1991 | Blair | ............... | 52/199 |
| 5,094,422 A * | 3/1992 | Tiffany | ............... | 248/519 |
| 5,226,263 A * | 7/1993 | Merrin et al. | ............... | 52/58 |
| 5,287,944 A * | 2/1994 | Woodyard | ............... | 182/3 |
| 5,346,036 A * | 9/1994 | Arisman et al. | ............... | 182/3 |
| 5,414,964 A * | 5/1995 | Bodycomb | ............... | 52/58 |
| 5,454,197 A * | 10/1995 | Horrigan | ............... | 52/199 |
| 5,553,685 A * | 9/1996 | Cook | ............... | 182/45 |
| 5,603,187 A * | 2/1997 | Merrin et al. | ............... | 52/58 |
| 5,647,915 A * | 7/1997 | Zukerman | ............... | 136/251 |
| 5,730,245 A * | 3/1998 | Conway | ............... | 182/3 |
| 5,746,031 A * | 5/1998 | Burns | ............... | 52/170 |
| 5,820,092 A * | 10/1998 | Thaler | ............... | 248/237 |
| 5,842,685 A * | 12/1998 | Purvis et al. | ............... | 256/67 |
| 5,979,844 A * | 11/1999 | Hopkins | ............... | 248/158 |
| 6,113,054 A * | 9/2000 | Ma | ............... | 248/523 |
| 6,439,344 B1 * | 8/2002 | Cole | ............... | 182/113 |
| 6,526,701 B2 * | 3/2003 | Stearns et al. | ............... | 52/24 |
| 6,640,503 B1 * | 11/2003 | Evensen et al. | ............... | 52/60 |
| 6,718,710 B2 * | 4/2004 | Platt | ............... | 52/296 |
| 6,729,597 B2 * | 5/2004 | Cholinski et al. | ............... | 248/646 |
| 6,938,871 B1 * | 9/2005 | Carlson | ............... | 248/519 |

(Continued)

*Primary Examiner*—Robert J Canfield
*Assistant Examiner*—Matthew J Gitlin
(74) *Attorney, Agent, or Firm*—Ted Masters (57) ABSTRACT

A method and apparatus for installing a stanchion on a tile roof includes a tile which has an aperture and a stanchion which fits through the aperture. An existing roof tile is removed and the stanchion is connected to the roof sheathing at the place of removal. The tile is then placed over the stanchion so that the stanchion project through the aperture. In an embodiment of the invention, a sleeve surrounds the aperture and a seal provides a weather proof seal between the stanchion and the sleeve.

4 Claims, 10 Drawing Sheets

U.S. PATENT DOCUMENTS

| | | | |
|---|---|---|---|
| 6,955,330 B1* | 10/2005 | Weiser et al. | 248/529 |
| 6,966,531 B2* | 11/2005 | Curtin | 248/237 |
| 7,040,061 B2* | 5/2006 | Rillie et al. | 52/200 |
| 7,163,083 B2* | 1/2007 | Argoud | 182/113 |
| 7,168,211 B2* | 1/2007 | Prenn et al. | 52/200 |
| 7,175,140 B2* | 2/2007 | Johnson et al. | 248/148 |
| 2004/0195487 A1* | 10/2004 | Harbaugh | 248/519 |
| 2006/0260670 A1* | 11/2006 | Terunuma et al. | 136/244 |
| 2007/0079865 A1* | 4/2007 | Warfield et al. | 136/244 |
| 2007/0210225 A1* | 9/2007 | Carnevali | 248/205.8 |
| 2008/0271391 A1* | 11/2008 | Dalmasso | 52/199 |
| 2009/0019795 A1* | 1/2009 | Szacsvay et al. | 52/173.3 |

* cited by examiner

Fig_8

Fig_9

Fig_10

Fig_11

Fig_18

Fig_19

METHOD FOR INSTALLING A STANCHION ON A TILE ROOF AND SYSTEM THEREFOR

TECHNICAL FIELD

The present invention pertains generally to roofs, and more particularly to a method and system for installing a stanchion on a tile roof while maintaining waterproof integrity.

BACKGROUND OF THE INVENTION

Many roofs comprise a plurality of individual overlapping roof tiles which are installed over a roof sheathing. With such tile roofs it is troublesome to install stanchions to support roof fixtures such as solar panel structures. The current method of adding a stanchion comprises removing several tiles, attaching a stanchion to the roof, waterproofing the stanchion at the subroof (sheathing), reinstalling the tile around the mount by cutting away the one or two tiles around the stanchion, and flashing the hole around the stanchion with metal flashing. An installation of a solar system usually requires multiple points of contact to comply with building codes. In many instances, it is easier and less expensive to actually remove an entire section of roof, and then reinstall the roof with flashings after the stanchions are in place.

BRIEF SUMMARY OF THE INVENTION

The present invention is directed to a method and system for installing a stanchion on a tile roof. The system includes a replacement tile which has an aperture and a stanchion which is shaped and dimensioned to be received by the aperture. An existing roof tile is removed and the stanchion is connected to the roof sheathing exposed by the removed existing tile. The tile of the present invention is then placed over the stanchion at the location of the removed existing tile. The stanchion projects up through the tile and is therefore available for connecting a roof fixture. The principles of the present invention may be applied to both flat and curved tiles.

In accordance with a preferred embodiment of the invention, a system for installing a stanchion on a roof having tiles disposed on top of roof sheathing includes a tile having an aperture. A stanchion is shaped and dimensioned to be received by the aperture, and is connectable to the roof sheathing.

In accordance with an aspect of the invention, the tile is disposable over the stanchion so that the stanchion projects through the aperture.

In accordance with another aspect of the invention, the stanchion includes a flange for connecting the stanchion to the roof sheathing.

In accordance with another aspect of the invention, the tile has a top surface and an opposite bottom surface. The tile includes a sleeve which connected to the top surface of the tile and surrounds the aperture. The tile is disposable over the stanchion so that the stanchion projects through the sleeve.

In accordance with another aspect of the invention, the roof sheathing defines a roof plane, and the top surface of the tile defines a tile plane. When the tile is installed on the roof, the tile plane forms an angle A with the roof plane. The sleeve has a central axis, and when the tile is viewed from the side, the central axis forms an acute angle B with the tile plane, wherein angle B is approximately equal to 90° minus angle A. In accordance with another aspect of the invention, angle B is about 84°.

In accordance with another aspect of the invention, the sleeve has a top surface. The top surface of the sleeve forms an angle C with the tile plane, wherein angle C is approximately equal to angle A.

In accordance with another aspect of the invention, a seal is provided for sealing a space between the stanchion and the sleeve.

In accordance with another aspect of the invention, the roof sheathing defines a roof plane, and the tile has a central longitudinal axis. When the tile is installed on the roof, the central axis of the tile forms an angle A with the roof plane. The sleeve has a central axis, and when the tile is viewed from the side, the central axis of the sleeve forms an acute angle B with the central axis of the tile, wherein angle B is approximately equal to 90° minus angle A.

In accordance with another aspect of the invention, the sleeve has a top surface. The top surface of the sleeve forms an angle C with the central axis of the tile, wherein angle C is approximately equal to angle A.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
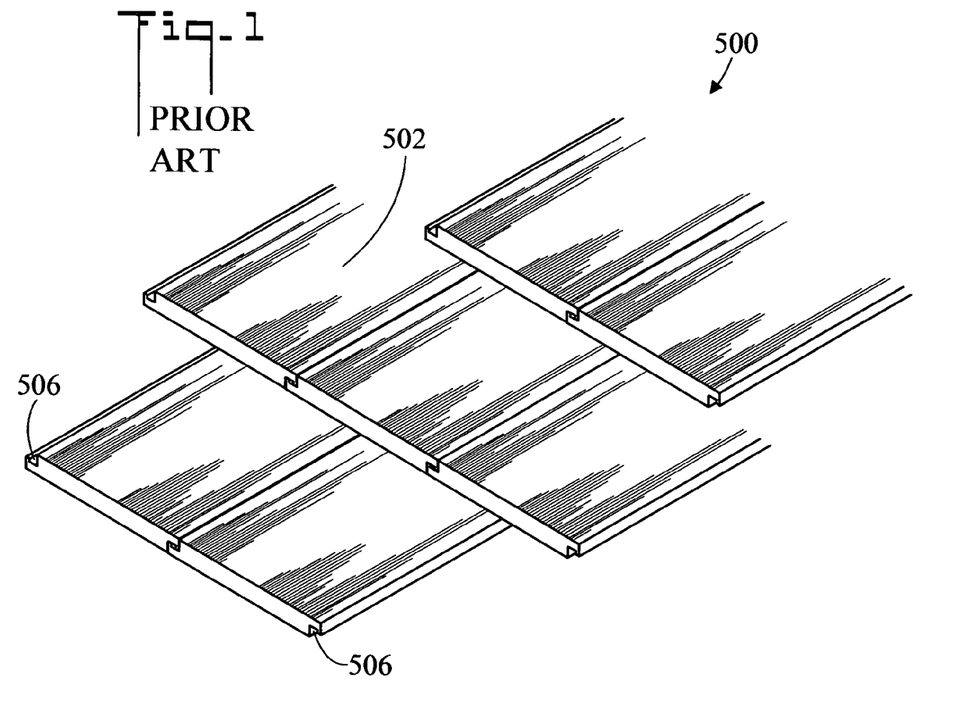
FIG. 1 is a fragmented perspective view of a prior art tile roof.
Figure 16:
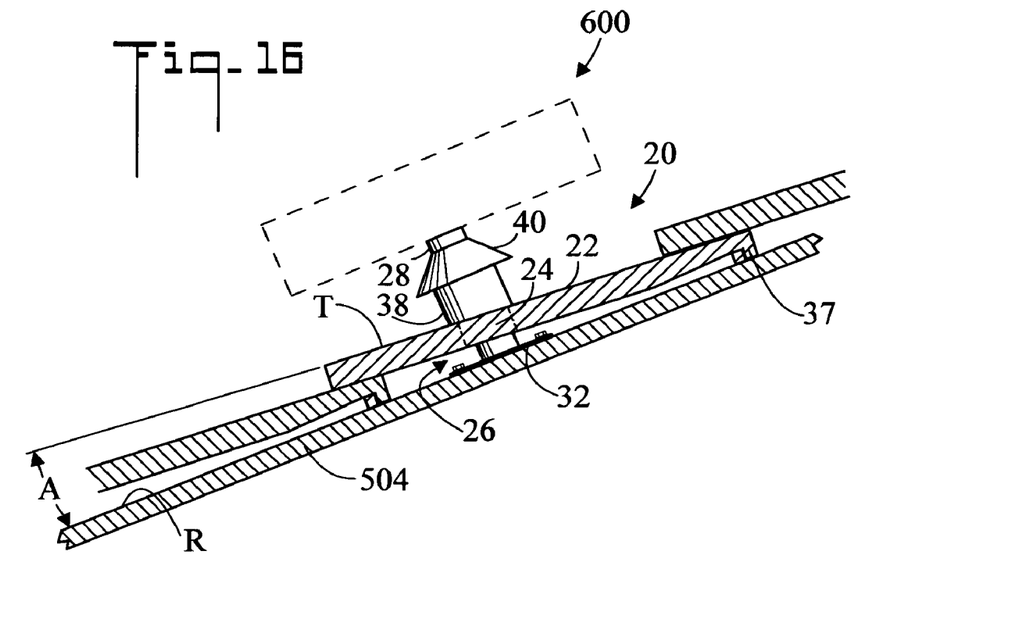
FIG. 16 is a cross sectional view along the line 16-16 of FIG. 15.

Referring initially to FIG. 1, there is illustrated a fragmented perspective view of a prior art tile roof, generally designated as 500. Tile roof 500 (also known as a tile roof system) includes a plurality of existing tiles 502 disposed on top of roof sheathing 504 (refer to FIGS. 2 and 16). Tiles 502 are typically fabricated from concrete, ceramic, or a polymer. In the shown embodiment tiles 502 have interlocking edges 506, however non-interlocking tiles 502 can also be used in conjunction with the present invention. Roof sheathing 504 (also known as sub-roofing) typically comprises sheets of planar material such as plywood which are placed on top of the rafters of a building to serve as the support for tiles 502. Referring also to FIG. 16, roof sheathing 504 defines a roof plane R.

Figure 2:
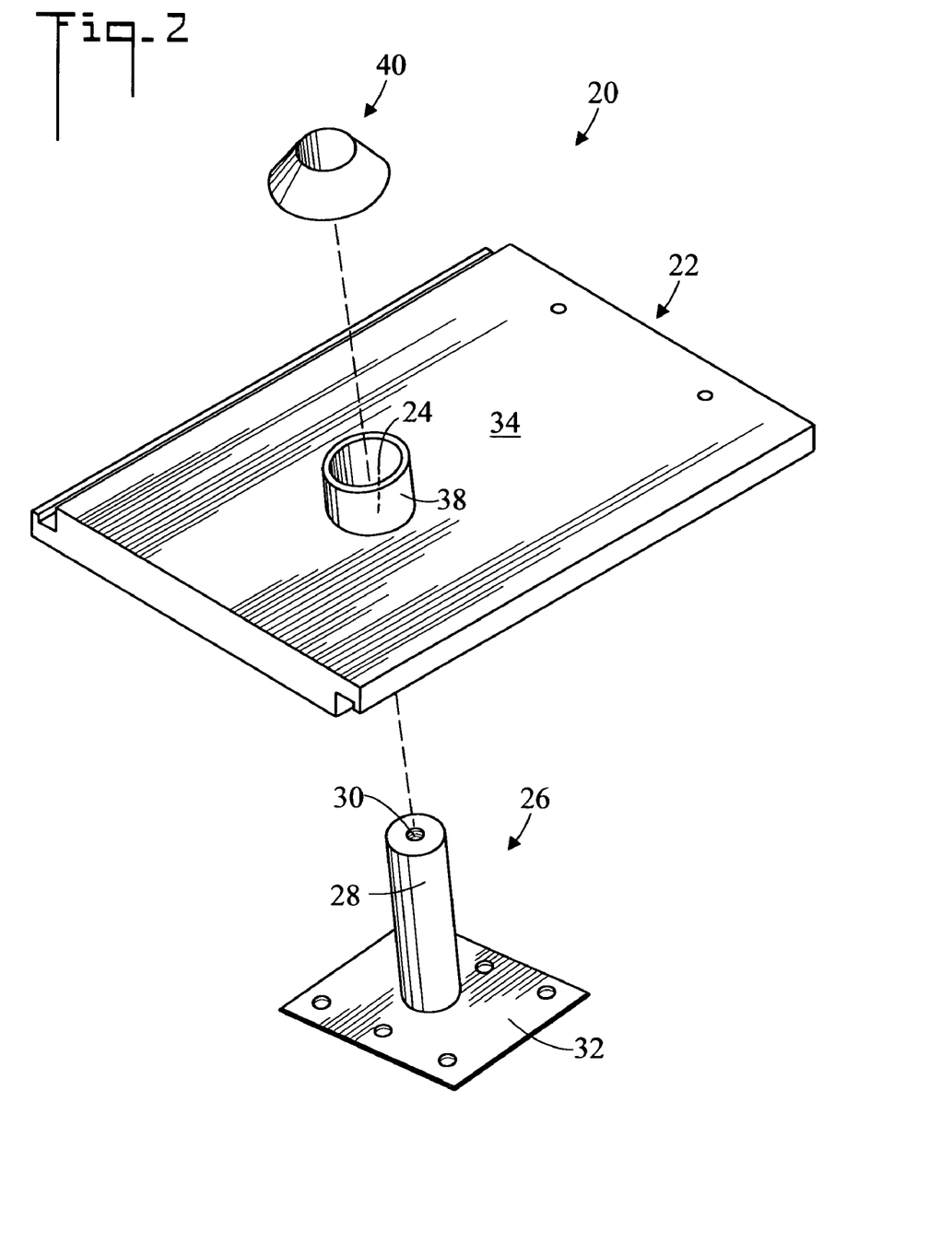
FIG. 2 is an enlarged exploded perspective view of a system for installing a stanchion on a roof having tiles disposed on top of roof sheathing in accordance with the present invention.
Figure 3:
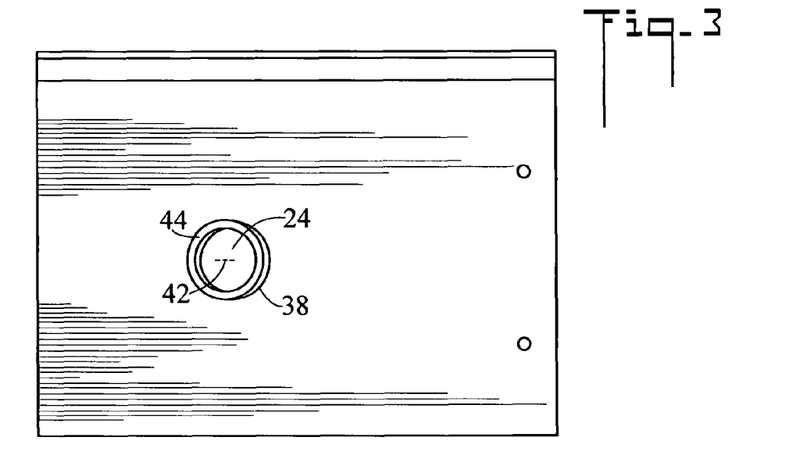
FIG. 3 is an enlarged top plan view of a tile in accordance with the present invention.

Now referring to FIG. 2, there is illustrated an enlarged exploded perspective view of a system for installing a stanchion on a roof having tiles 502 disposed on top of roof sheathing 504 in accordance with the present invention, generally designated as 20. System 20 includes a tile 22 having an aperture 24 (also refer to FIG. 3). System 20 further includes a stanchion 26 which is shaped and dimensioned to be received by aperture 24 in tile 22 (also refer to FIGS. 14 and 16). Tile 22 is disposable over stanchion 26 so that stanchion 26 projects through aperture 24 (also refer to FIGS. 14 and 16). In the shown embodiment, stanchion 26 includes an upstanding post 28 which is received by and projects through aperture 24 (also refer to FIG. 14). Post 28 has a threaded portion 30 for connecting solar panels or other roof fixtures 600 (also refer to FIG. 16). Stanchion 26 also includes a flange 32 for connecting stanchion 26 to the roof sheathing 504 with bolts or screws (refer to FIG. 13).

Figure 5:
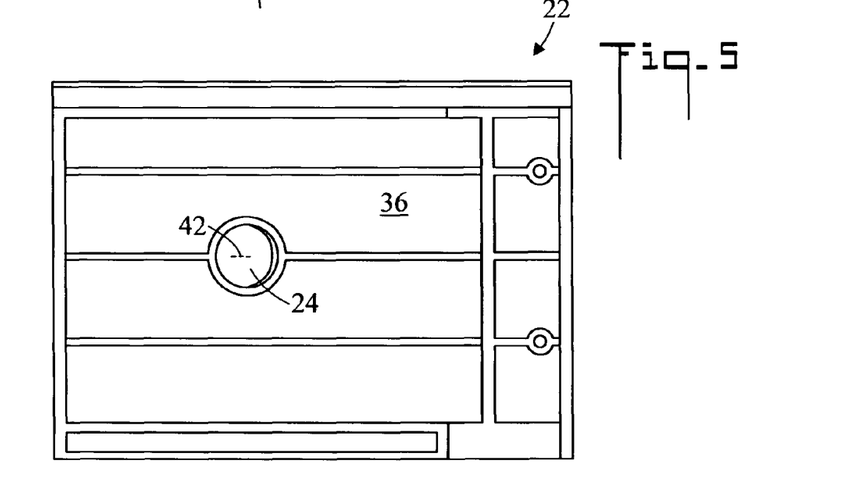
FIG. 5 is an enlarged bottom plan view of the tile.

Tile 22 includes a top surface 34 and an opposite bottom surface 36 (refer also to FIG. 5). Tile 22 includes a sleeve 38 which is connected to top surface 34 of tile 22 and surrounds aperture 24. In the shown embodiment sleeve 38 is an integral portion of tile 22. Tile 22 is disposable over stanchion 26 so that stanchion 26 projects through sleeve 38 (refer also to FIGS. 14 and 16). It is noted that it is post 28 of stanchion 26 which projects through aperture 24 and sleeve 38.

Figure 15:
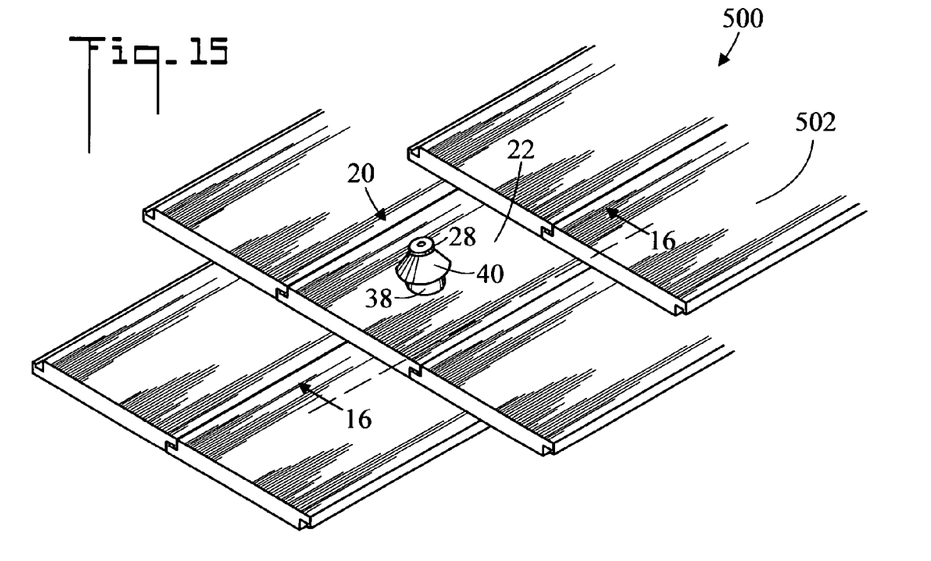
FIG. 15 is a fragmented perspective view of the seal installed on the stanchion and tile.

System 20 also includes a weatherproofing seal 40 for sealing the space between stanchion 26 and sleeve 38 (also refer to FIGS. 15 and 16). In the shown embodiment, seal 40 is a collar fabricated from a resilient material such as rubber which tightly fits over post 28 of stanchion 26 and sleeve 38 to effect a water tight seal between post 28 and sleeve 38.

Figure 4:
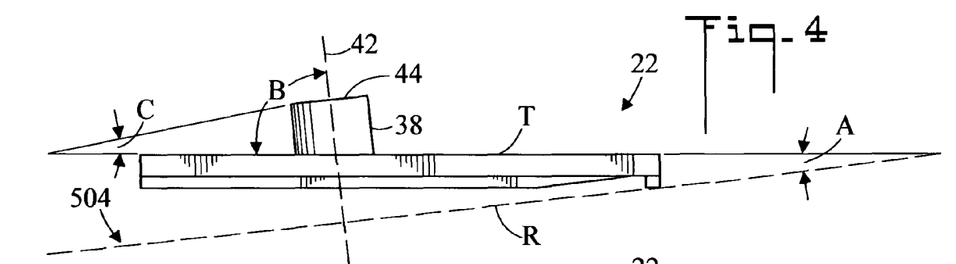
FIG. 4 is an enlarged side elevation view of the tile.
Figure 6:
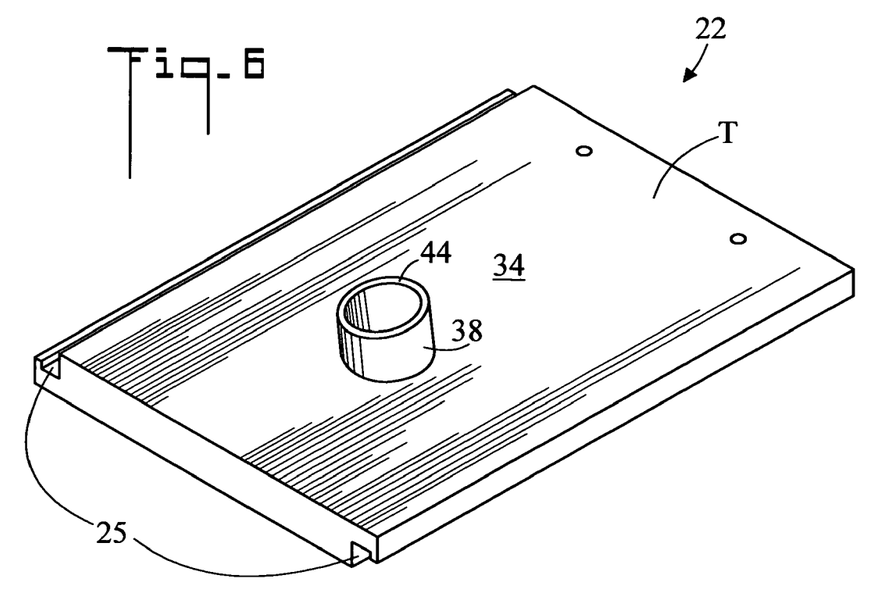
FIG. 6 is an enlarged top perspective view of the tile.
Figure 7:
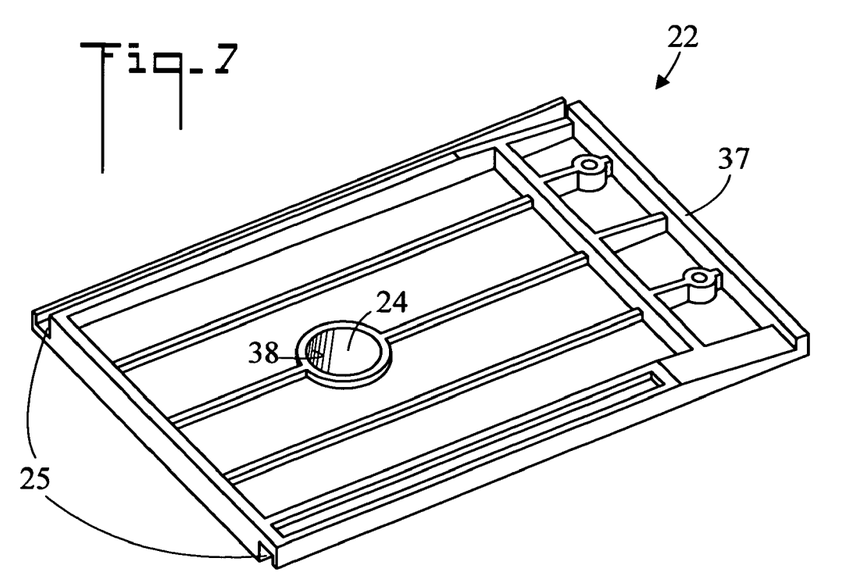
FIG. 7 is and enlarged bottom perspective view of the tile.

FIGS. 3 through 7 are enlarged top plan, side elevation, bottom plan, top perspective, and bottom perspective views respectively of tile 22, showing aperture 24, sleeve 38, and top surface 34. Referring to FIG. 4, top surface 34 of tile 22 defines a tile plane (viewed on edge) Referring to FIGS. 4 and 16, when tile 22 is installed on roof 500, tile plane T forms an angle A with roof plane R (viewed on edge, refer also to FIG. 16). Sleeve 38 has a central axis 42. Central axis 42 forms an acute angle B with tile plane T, wherein angle B is approximately equal to 90° minus angle A. In an embodiment of the invention, angle B is about 84°. Sleeve 38 also has a top surface 44 which forms an angle C with tile plane T. Angle C is approximately equal to angle A. As is shown in FIGS. 6 and 7, tile 22 includes interlocking edges 25 which are interlockable with interlocking edges 506 of adjacent existing tiles 502 as is shown in 14, and 15 (refer also to FIG. 1). Also, as shown in FIG. 7, a transverse lip 37 is disposed on the bottom of tile 22 (also refer to FIG. 17).

Figure 8:
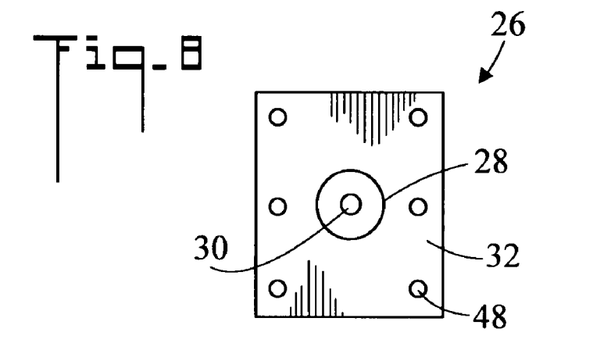
FIG. 8 is an enlarged top plan view of a stanchion.
Figure 9:
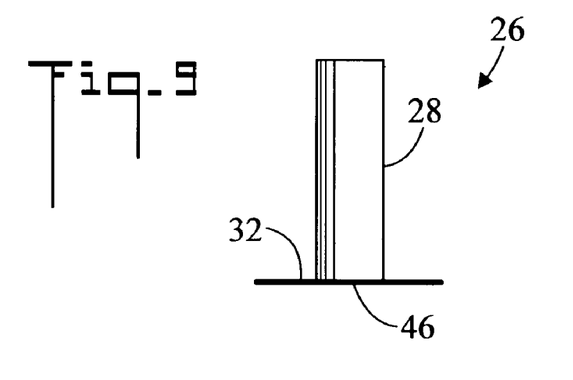
FIG. 9 is an enlarged side elevation view of the stanchion.
Figure 13:
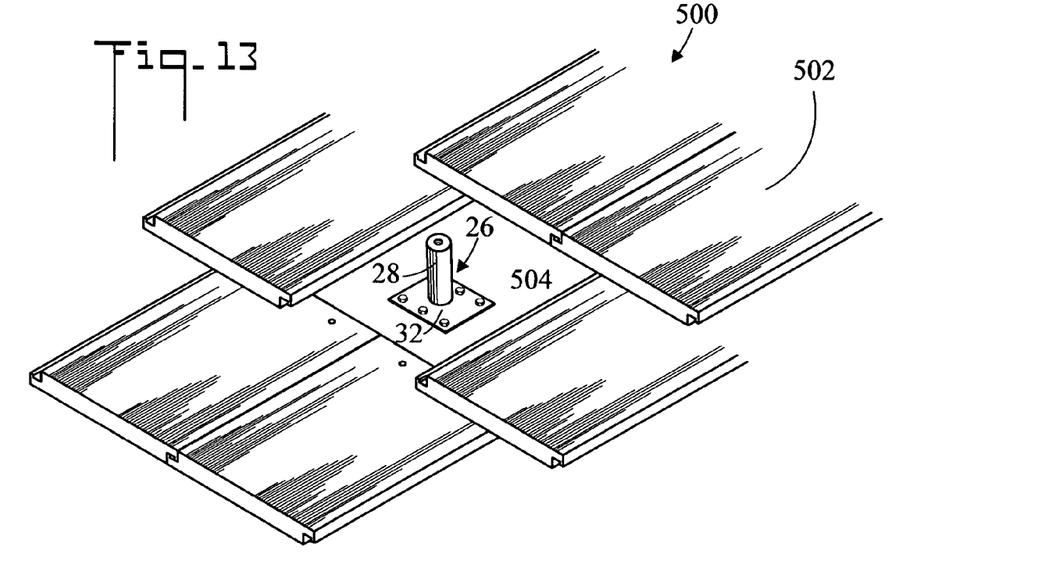
FIG. 13 is a fragmented perspective view of the stanchion installed on the roof sheathing.

FIGS. 8 and 9 are enlarged top plan and side elevation views respectively of stanchion 26 showing post 28, threaded portion 30, and holes 48 for connecting stanchion 26 to roof sheathing 504 (refer also to FIG. 13). In an embodiment of the invention, the bottom of flange 32 includes double sided tape 46 to mechanically strengthen the connection to roof sheathing 504.

Figure 10:
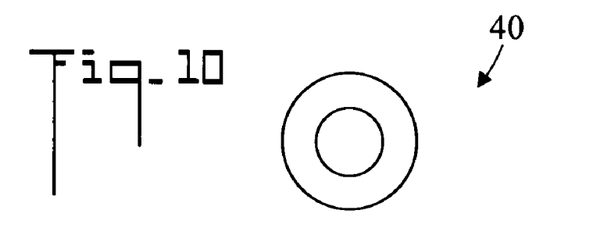
FIG. 10 is an enlarged top plan view of a seal.
Figure 11:
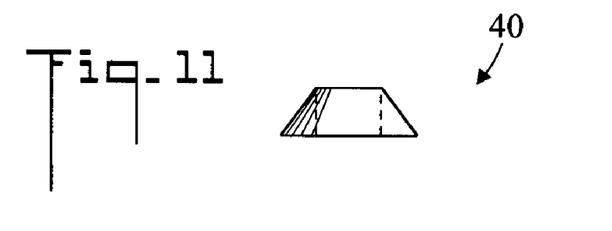
FIG. 11 is an enlarged side elevation view of the seal.

FIGS. 10 and 11 are enlarged top plan and side elevation views respectively of seal 40. Referring also to FIG. 15, seal 40 snuggly fits over post 28 of stanchion 26 to provide a weatherproof seal between post 28 and sleeve 38.

Figure 12:
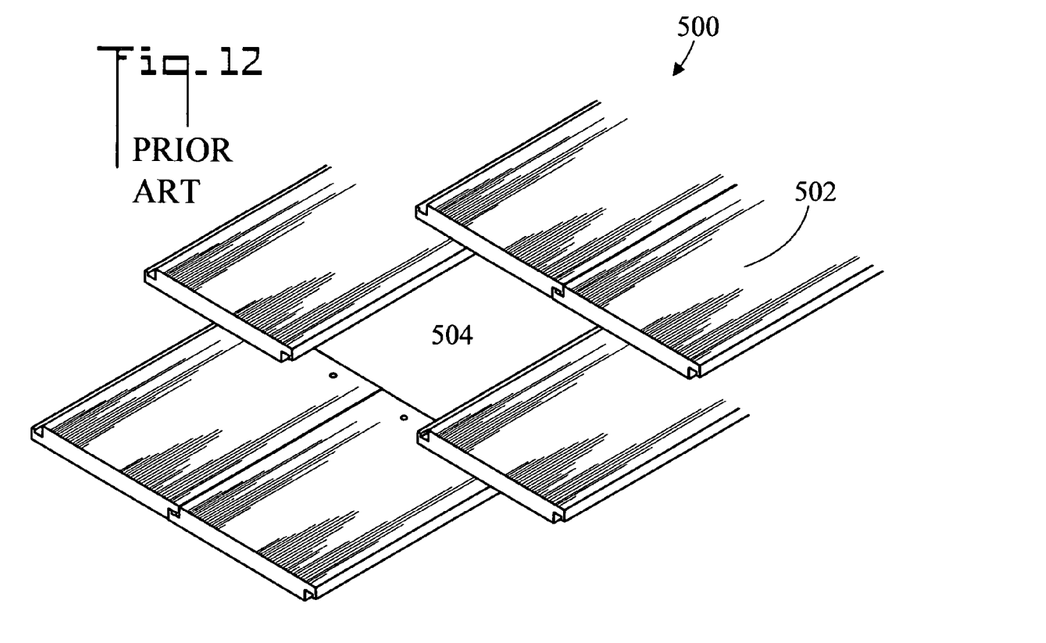
FIG. 12 is a fragmented perspective view of the prior art roof with one of the existing tiles removed.

FIG. 12 is a fragmented perspective view of prior art roof 500 with one of the existing tiles 502 removed thereby exposing roof sheathing 504.

FIG. 13 is a fragmented perspective view of stanchion 26 installed on a roof sheathing 504 showing post 28 threaded portion 30 and flange 32. Before stanchion 26 is connected to roof sheathing 504, its position is defined (measured) so that stanchion 26 is in the correct location to be received by sleeve 38 of tile 22 when tile 22 is placed over stanchion 26 to replace the existing tile 502 (refer to FIG. 14). If roof sheathing 504 is covered with tar paper or other material, that material is removed prior to installing stanchion 26.

Figure 14:
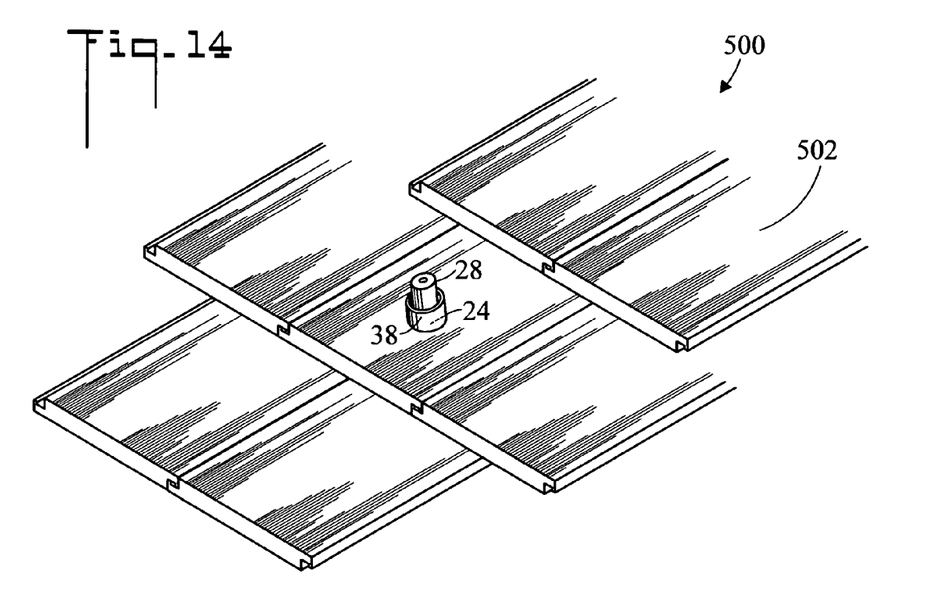
FIG. 14 is a fragmented perspective view of a tile installed over the stanchion.

FIG. 14 is a fragmented perspective view of tile 22 installed over stanchion 26 showing aperture 24, sleeve 38, and post 28. Tile 22 has been placed in the previous location of removed existing tile 502 (refer to FIG. 12) so that post 28 of stanchion 26 projects through aperture 24 and sleeve 38. In this position, stanchion 26 is now available for connecting solar panels or other roof fixtures 600 (also refer to FIG. 16).

FIG. 15 is a fragmented perspective view of seal 40 installed stanchion 26 and tile 22. Seal 40 ensures a watertight connection between post 28 of stanchion 26 and sleeve 38 of tile 22.

FIG. 16 is a cross sectional view along the line 16-16 of FIG. 15 showing roof sheathing 504, tile 22, aperture 24, sleeve 38, stanchion 26, post 28, flange 32, and seal 40. Angle A is the angle between tile plane T and roof plane R. A roof fixture 600 is connected to post 28 of stanchion 26.

Figure 17:
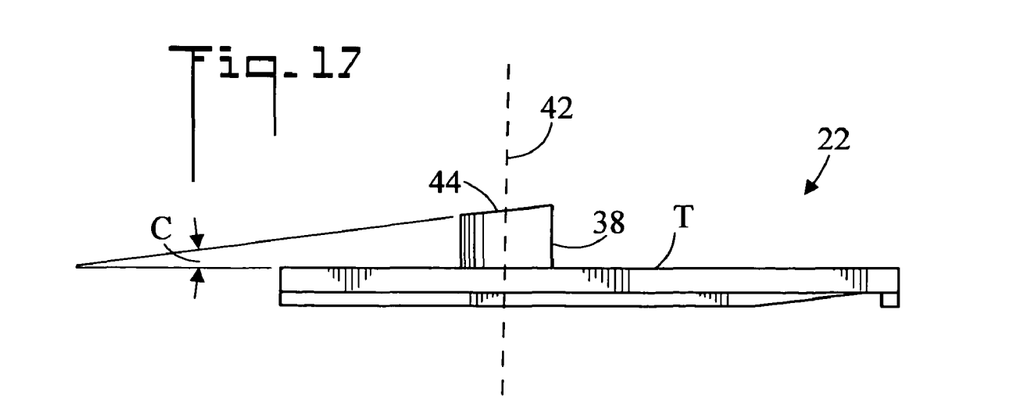
FIG. 17 is an enlarged side elevation view of a second embodiment of the tile.

FIG. 17 is an enlarged side elevation view of a second embodiment of tile 22. In this embodiment central axis 42 of sleeve 38 does not form an acute angle B with tile plane T as in FIG. 4, but is rather substantially perpendicular to tile plane T. The top surface 44 of sleeve 38 is inclined so that it forms an angle A with tile plane T. This facilitates the installation of seal 40.

Figure 18:
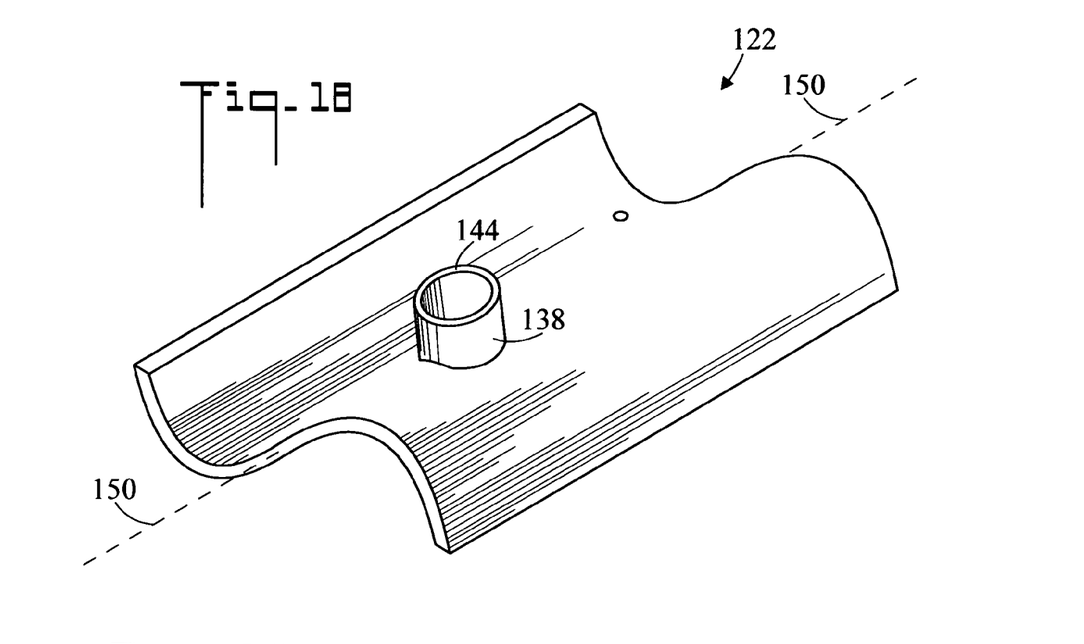
FIG. 18 is an enlarged top perspective view of a second embodiment tile.
Figure 19:
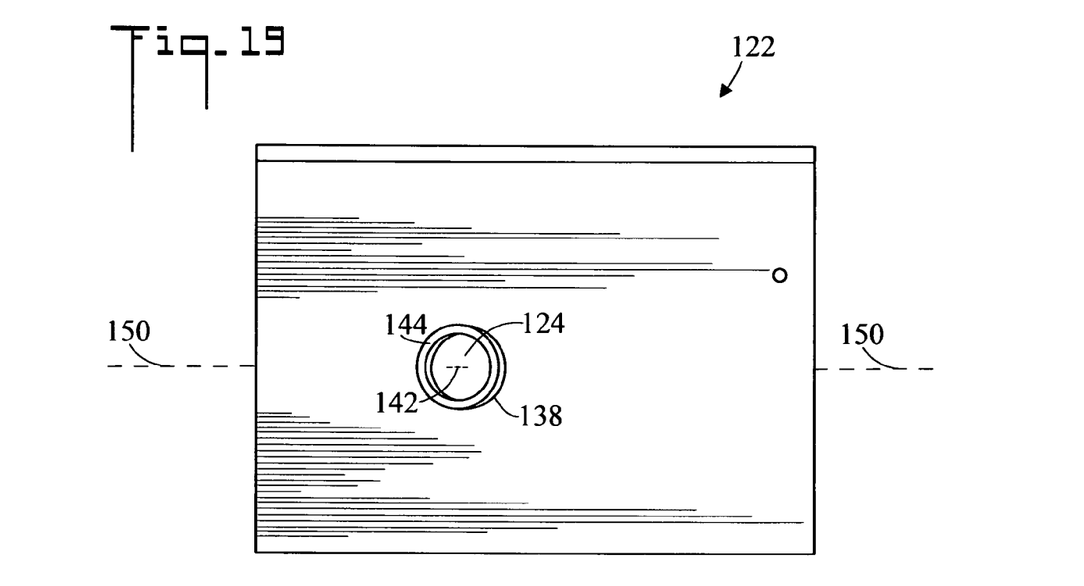
FIG. 19 is an enlarged top plan view of the second embodiment tile.
Figure 20:
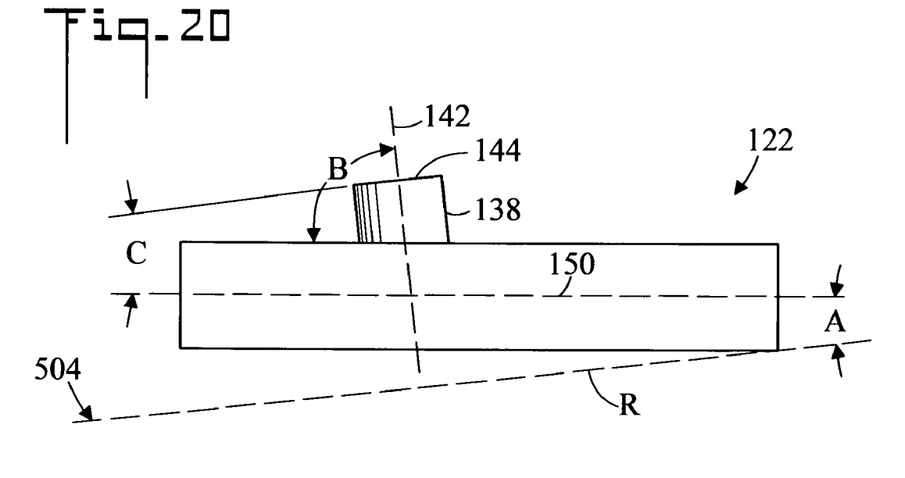
FIG. 20 is an enlarged side elevation view of the second embodiment tile; and, FIG. 21 is an enlarged top perspective view of a third embodiment tile.

FIGS. 18-20 are enlarged top perspective, enlarged top plan, and enlarged side elevation views respectively of a second embodiment tile, generally designated 122. Tile 122 has a double curve as opposed to the flat tile of tile 22. As with tile 22, tile 122 includes an aperture 124, a sleeve 138 which surrounds aperture 124 and which has a top surface 144 and a central axis 142. Tile 122 also includes a central longitudinal axis 150. When tile 122 is installed on roof 500, central axis 142 of tile 122 forms an angle A with roof plane 504. When tile 122 is viewed from the side (FIG. 20), central axis 142 of sleeve 138 forms an acute angle B with central axis 150 of tile 122, wherein angle B is approximately equal to 90° minus angle A. In an embodiment of the invention, angle B is about 84°. Sleeve 138 has a top surface 144. Top surface 144 forms an angle C with central axis 142 of tile 138, wherein angle C is approximately equal to angle A. It is noted that, tile 122 cooperates with stanchion 26 and seal 40 in the same manner as is described above for tile 22. That is, post 28 of stanchion 26 projects through aperture 124 and sleeve 138, and seal 40 seals the space between stanchion 26 and sleeve 138.

Figure 21:
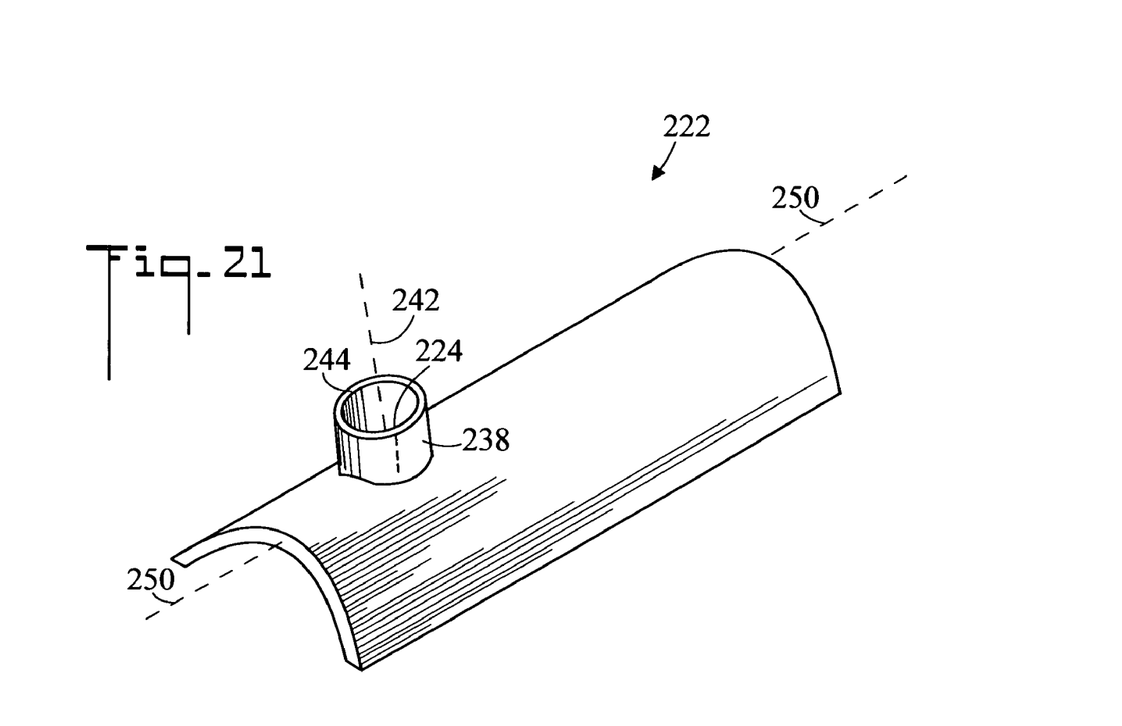

FIG. 21 is an enlarged top perspective view of a third embodiment tile, generally designated as 222. Tile 222 is a variation of tile 122 which has only one curve. Tile 222 includes sleeve 238 having a top surface 244, an aperture 224, and a central longitudinal axis 250. The angular relationships discussed above for tile 122 also apply to tile 222. Tile 222 cooperates with stanchion 26 and seal 40 in the same manner as is described above for tile 22.

In terms of use, a method for installing a stanchion 26 on a roof 500 includes:

(a) providing a roof 500 having a plurality of existing tiles 502 disposed on top of roof sheathing 504;

(b) providing a system 20 for installing a stanchion 26 on roof 500 including:

a tile 22 having an aperture 24;

a stanchion 26 shaped and dimensioned to be received by aperture 24;

(c) removing one of the existing tiles 502:

(d) defining a position where stanchion 26 is to be connected to roof sheathing 504;

(e) connecting stanchion 26 to roof sheathing 504 at the position of step (d); and, (f) placing tile 22 at the previous location of the removed existing tile 502 of step (c) and over stanchion 26 so that stanchion 26 projects through aperture 24.

The method further including:

in step (b), stanchion 26 including a flange 32 for connecting stanchion 26 to roof sheathing 504; and, in step (e), using flange 32 to connect stanchion 26 to roof sheathing 504.

The method further including:

in step (b), tile 22 having a top surface 34 and an opposite bottom surface 36;

tile 22 has a sleeve 38 connected to top surface 34 of tile 22 and surrounding aperture 38; and, in step (f), stanchion 26 projecting through sleeve 38.

The method further including:

in step (a), roof sheathing 504 defining a roof plane R;

in step (b), top surface 34 of tile 22 defining a tile plane T;

in step (f), tile plane T forming an angle A with roof plane R;

in step (b), sleeve 38 having a central axis 42; and, in step (b), when tile 22 is viewed from the side, central axis 42 forming an acute angle B with tile plane T, wherein angle B is approximately equal to 90° minus angle A.

The method further including:

in step (b), angle B being about 84°.

The method further including:

in step (b), sleeve 38 having a top surface 44; and, in step (b), top surface 44 of sleeve 38 forming an angle C with tile plane T, wherein angle C is approximately equal to A.

The method further including:

in step (b), a seal 40 for sealing a space between stanchion 26 and sleeve 38; and, after step (f), installing seal 40 over stanchion 26.

The method further including:

in step (a), roof sheathing 504 defining a roof plane R;

in step (b), tile 122 (or 222) having a central axis 150 (or 250);

in step (f), central axis 150 (or 250) of tile 122 (or 222) forming an angle A with roof plane R;

in step (b), sleeve 138 (or 238) has a central axis 142 (or 242); and, in step (b), when tile 122 (or 222) is viewed from the side, central axis 142 (or 242) of sleeve 138 (or 238) forms an acute angle B with central axis 142 (or 242) of tile 122 (or 222), wherein angle B is approximately equal to 90° minus angle A.

The method further including:

in step (b), angle B being about 84°.

The method further including:

in step (b), sleeve 138 (or 238) having a top surface 144 (or 244); and, in step (b), top surface 144 (or 244) of sleeve 138 (or 238) forming an angle C with central axis 142 (or 242) of tile 122 (or 222), wherein angle C is approximately equal to A.

The preferred embodiments of the invention described herein are exemplary and numerous modifications, variations, and rearrangements can be readily envisioned to achieve an equivalent result, all of which are intended to be embraced within the scope of the appended claims.

We claim:

1. A method for installing a stanchion on a roof, comprising:

(a) providing a roof having a plurality of existing tiles disposed in overlapping relationship on top of roof sheathing;

(b) providing a system for installing a stanchion on said roof, including:

a tile having an aperture and a top surface, said tile including a sleeve which is connected to said top surface and which surrounds said aperture, said sleeve being an integral portion of said tile;

a stanchion which includes (1) a post which is shaped and dimensioned to be received by said aperture and said sleeve, and (2) a flange for connecting said stanchion to said roof sheathing;

(c) removing one of said existing tiles;

(d) defining a position where said stanchion is to be connected to said roof sheathing;

(e) connecting said flange to said roof sheathing at said position of step (d); and, (f) after step (e), placing said tile at the previous location of said removed existing tile of step (c) so that said post of said stanchion projects through said aperture and said sleeve.

2. The method of claim 1, further including:

in step (e), said connection of said flange to said roof sheathing being with bolts or screws.

3. The method of claim 1, further including:

in step (b), said tile having a down slope edge and an up slope edge;

in step (b), said sleeve not longitudinally centered on said tile, with said sleeve being closer to said down slope edge than to said up slope edge.

4. The method of claim 1, further including:

in step (b), a seal for sealing a space between said stanchion and said sleeve; and, after step (f), installing said seal over said stanchion.

* * * * *